United States Patent [19]
Silkin

[11] 3,884,101
[45] May 20, 1975

[54] RADIAL ARM SAW GUARD

[76] Inventor: Howard Silkin, c/o Home & Industry Tool Distributors, Inc., 2867 Long Beach Rd., Oceanside, N.Y. 11572

[22] Filed: Aug. 19, 1974

[21] Appl. No.: 498,528

[52] U.S. Cl. ................... 83/544; 83/397; 83/478; 83/860; 144/251 R
[51] Int. Cl. .................... B27b 5/28; B27g 19/04
[58] Field of Search .......... 83/397, 398, 471.2, 478, 83/860, 544, 545, 546; 144/251 R

[56] References Cited
UNITED STATES PATENTS

| | | | |
|---|---|---|---|
| 2,669,264 | 2/1954 | Wilson | 83/478 |
| 3,441,067 | 4/1969 | Forcier | 144/251 R X |
| 3,519,041 | 7/1970 | Palmer | 83/544 X |

*Primary Examiner*—Willie G. Abercrombie
*Attorney, Agent, or Firm*—Peter L. Tailer

[57] ABSTRACT

A radial arm saw guard for the exposed lower portion of the blade has inner and outer lengths of articulated links fixed to the blade housing to hang on each side of the blade. Each length has a pair of straight links pivotally connected to the front and back of a side of the housing with at least five intermediate links therebetween. The intermediate links are laterally offset a distance equal to their thickness and they are joined by pins extending through longitudinal slots in their ends. Each pin mounts a plastic disk on the side away from the blade, the disks having a diameter at least fifty per cent greater than the vertical depth of the links.

3 Claims, 7 Drawing Figures

PATENTED MAY 20 1975  3,884,101

RADIAL ARM SAW GUARD

BACKGROUND OF THE INVENTION

This invention relates to radial arm saw guards for the lower, exposed portion of a blade which extends below the upper blade housing. These guards must allow the saw blade to move freely relative to a workpiece while preventing an operator's hand from being able to move laterally against a blade. Guards of this nature are now required by law in many situations where over arm saws are used commercially.

DESCRIPTION OF THE PREFERRED EMBODIMENT

Figure 1:
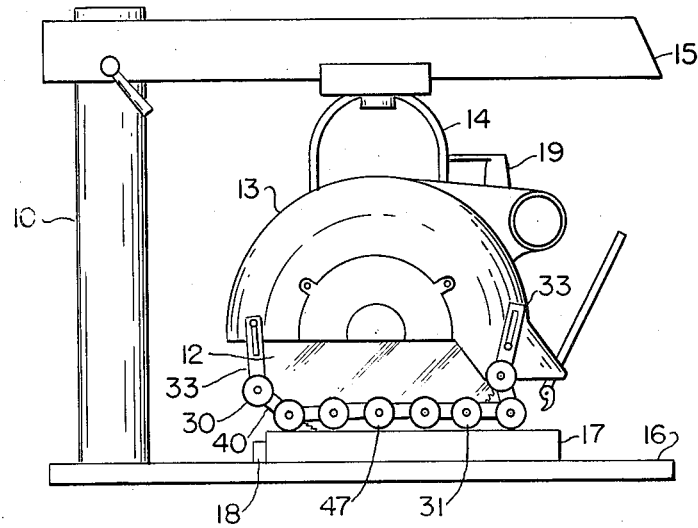
FIG. 1 is a side view of an over arm saw with the guard of this invention mounted thereon.
Figure 2:
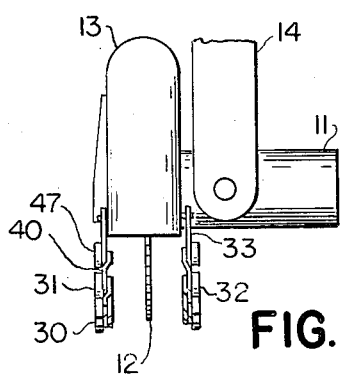
FIG. 2 is a front view of a broken away mounting bracket with a saw motor, upper blade housing, and blade of an over arm saw with the saw guard of this invention mounted thereon.
Figure 3:
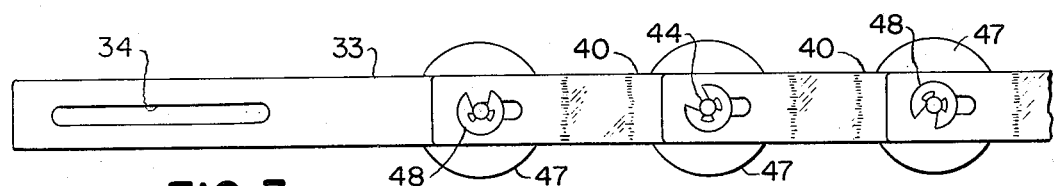
FIG. 3 is an inner side view of a straight link and an attached broken away length of intermediate links of the saw guard of this invention.
Figure 4:
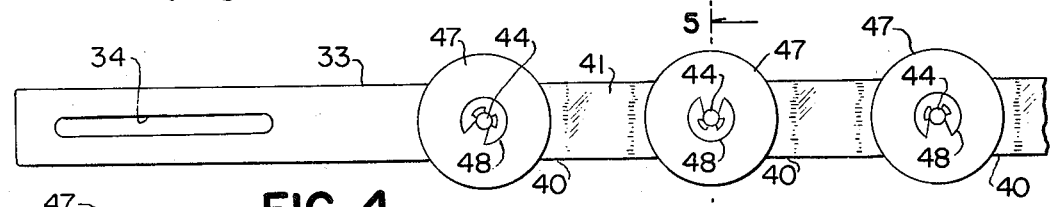
FIG. 4 is an outer side view of the links of FIG. 3.

As shown in FIGS. 1 and 2, a conventional over arm radial saw 10 has a motor 11 on which a blade 12 is mounted to extend below an upper blade housing 13. A suitable bracket 14 slidably supports motor 11 below arm 15 above work table 16 on which a workpiece 17 rests against backstop 18. To cut workpiece 17, the motor 11 is slid forward by handle 19 to move the rotating blade 12 through it. Rip cuts, angle cuts, and the like, are made in the conventional manner.

Figure 6:
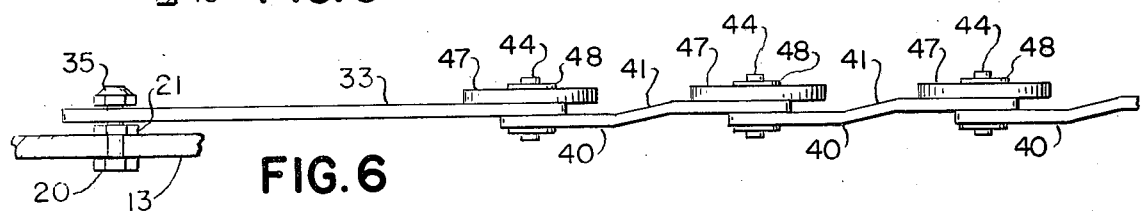
FIG. 6 is a top view of the links of FIG. 3 shown attached to a fragment of an upper blade housing of a radial arm saw.
Figure 7:
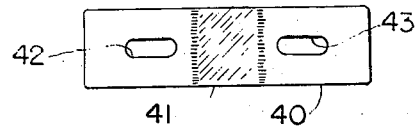
FIG. 7 is a side view of an intermediate link.

To secure the guard 30 of this invention, only four holes (not shown) need be drilled in the blade housing 13, two on the outside, front and back, and two on the inside or motor side front and back. A screw 20, as shown in FIG. 6, is passed through each hole and fixed by a nut 21 to project therefrom.

As may be seen in FIGS. 1–3 and 6, the chain guard 30 of this invention consists of two lengths 31 and 32 of articulated links. End links 33 of each length are straight containing an elongated longitudinal slot at one end and an aperture (not shown) at the other. The slots 34 are placed over projecting ends of screws 20 and slidably fixed by means of an elastic stop nut 35 or any suitable equivalent. This mounting suspends the lengths 31 and 32 of the guard 30 on each side of blade 12 as shown in FIG. 2.

Figure 5:
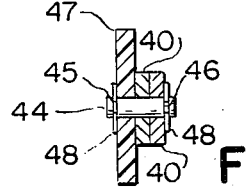
FIG. 5 is a section taken on line 5—5 of FIG. 4.

As shown in FIGS. 3–7, intermediate links 40 are laterally offset in their centers 41 a distance equal to their lateral thickness. The ends of each link 40 contain longitudinal slots 42 and 43. Pins 44, each containing circumferential grooves 45 and 46, are passed through the slots 42 and 43 to join the intermediate links 40 and to join the endmost intermediate links 40 to the straight endmost links 33. A plastic disk 47 is placed on each pin 44 on a side disposed away from blade 12. The pins 44 are each secured by a pair of snap rings 48 which seat in the circumferential grooves 45 and 46 as shown in FIG. 5.

The guard 30 with its lengths 31 and 32 is particularly effective as the links 33 and 40 will only articulate in the same plane as the blade 12. This prevents any inadvertent sideways movement of an operator's hand from contacting the rotating blade 12. The articulation of the links 33 and 40, however, allows a blade 12 to be freely moved into a workpiece as shown in FIG. 1. The offset at the center 41 of each intermediate link 40 allows the use of a single row of flat, identical links which are connected to stay in one plane. The disks 47, being at least fifty per cent larger in diameter than the vertical thickness of the links 40, substantially prevent the links 40 from touching a workpiece and marring it. The disks 47 are of a plastic so that they will roll and slide easily. The links 33 and 40 are best of metal strip to be strong enough to resist lateral movement.

The elongated slots 42 and 43 in links 40 and the longer slots 34 in links 33 enable guard 30 to remain substantially adjacent to a blade 12 as it cuts through a wide variety of workpiece shapes. A minimum number of links 40, five for each length 31 and 32, is required to provide an effective guard 30 that will articulate sufficiently to protect a rotating blade 12. The particular construction of guard 30 enables its parts, the links 33 and 40, the pins 44, the plastic disks 47, and the snap rings 48, to be kept in stock and assembled to form a guard for any size of radial arm saw. For maximum depth of cut, only the inner length 32 need be removed. For angle cuts and ripping, both lengths 31 and 32 may be left in place.

The links 33 and 40 are best fabricated from flat stock with the links 33 being substantially twice the length of the links 40. In each link 33, slot 34 extends from the end of link 33 to its center. This allows a screw or other fastening 20 to have a slot 34 slide about it as shown at the back of housing 13 in FIG. 1. This takes up slack in the lengths 31 and 32 as blade 12 passes through a workpiece. The shorter slots 42 and 43 in links 40 also take up slack.

While this invention has been shown and described in the best form known, it will nevertheless be understood that this is purely exemplary and that modifications may be made without departing from the spirit of the invention.

I claim:

1. A guard for use with a radial arm saw having a motor, a blade driven by and mounted on said motor, and a housing mounted on said motor from which said blade projects downward, said housing having a front and a back and a motor side and an outer side, said guard comprising, in combination, endmost links each containing an elongated longitudinal slot at one end and an aperture at the other end, fastening means projecting from the front and back of said housing on the motor and the outer side, each of said fastening means slidably extending through the longitudinal slot of one of said endmost links slidably securing said endmost links to said housing, intermediate links each containing longitudinal slots at the ends thereof and each having a center containing a lateral offset equal to the thickness of said intermediate links, plastic disks having a diameter at least fifty per cent greater than the vertical thickness of said intermediate links, and pins connecting at least five intermediate links between each pair of said endmost links forming a length of articulated links on each side of said housing, said lengths hanging on each side of said blade and articulating in the plane of said blade, each of said pins mounting one of said plastic disks thereon on the sides of the lengths disposed away from said blade.

2. The combination according to claim 1 wherein said endmost links are substantially twice the length of said intermediate links, and the longitudinal slot in each of said endmost links extends substantially from the end thereof to its center.

3. The combination according to claim 2 wherein said pins contain circumferential grooves at each end, and with the addition of snap rings seating in said grooves holding each of said pins within overlapping ends of two links and one of said disks.

* * * * *

UNITED STATES PATENT AND TRADEMARK OFFICE
CERTIFICATE OF CORRECTION

PATENT NO. : 3,884,101
DATED : May 20, 1975
INVENTOR(S) : Howard Silkin

It is certified that error appears in the above-identified patent and that said Letters Patent are hereby corrected as shown below:

The correct spelling of the inventor's name, "Howard Silkin" should be -- Howard Silken --.

Signed and Sealed this second Day of December 1975

[SEAL]

Attest:

RUTH C. MASON
*Attesting Officer*

C. MARSHALL DANN
*Commissioner of Patents and Trademarks*